US012452865B2

(12) United States Patent
Shinohara et al.

(10) Patent No.: US 12,452,865 B2
(45) Date of Patent: Oct. 21, 2025

(54) WIRELESS COMMUNICATION SYSTEM, AND WIRELESS COMMUNICATION CONTROL APPARATUS, AND METHOD

(71) Applicant: NTT, Inc., Tokyo (JP)

(72) Inventors: Shoko Shinohara, Musashino (JP); Hirantha Abeysekera, Musashino (JP); Toshiro Nakahira, Musashino (JP); Koichi Ishihara, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 383 days.

(21) Appl. No.: 17/911,771

(22) PCT Filed: Mar. 18, 2020

(86) PCT No.: PCT/JP2020/012033
§ 371 (c)(1),
(2) Date: Sep. 15, 2022

(87) PCT Pub. No.: WO2021/186625
PCT Pub. Date: Sep. 23, 2021

(65) Prior Publication Data
US 2023/0137745 A1  May 4, 2023

(51) Int. Cl.
*H04W 72/00* (2023.01)
*H04W 72/20* (2023.01)
*H04W 72/56* (2023.01)

(52) U.S. Cl.
CPC ........... *H04W 72/20* (2023.01); *H04W 72/56* (2023.01)

(58) Field of Classification Search
CPC ..... H04W 16/18; H04W 24/02; H04W 84/12; H04W 84/18; H04W 72/20; H04W 72/56
See application file for complete search history.

(56) References Cited

U.S. PATENT DOCUMENTS

2016/0246293 A1* 8/2016 Sakai ................... G05B 15/02
2017/0325106 A1* 11/2017 Goldsmith ........... H04W 24/02
2018/0295528 A1* 10/2018 Anantha .............. H04W 24/08
2021/0051486 A1* 2/2021 Pandey ................ H04L 1/0026

OTHER PUBLICATIONS

LAN/MAN Standards Committee of the IEEE Computer Society, "Part 11: Wireless LAN Medium Access Control (MAC) and Physical Layer (PHY) Specifications, Amendment 2: Sub 1 GHz License Exempt Operation," IEEE Std 802.11ahTM-2016, May 5, 2017, 594 pages.

* cited by examiner

*Primary Examiner* — Quoc Thai N Vu
(74) *Attorney, Agent, or Firm* — Fish & Richardson P.C.

(57) ABSTRACT

A wireless communication system includes a wireless base station that performs wireless communication with a wireless terminal; and a wireless communication control station that is communicably connected to the wireless base station. The wireless communication control station includes a determination unit that determines a requirement that is prioritized among multiple types of requirements in wireless communication, a setting unit that sets the information indicating the parameter to be used for communication control by the wireless base station, and a transmission unit that transmits the information set by the setting unit to the wireless base station.

6 Claims, 22 Drawing Sheets

Fig. 6

| THE NUMBER OF TERMINALS (STANDARD NUMBER) | TRAFFIC LOAD (EXAMPLE) | TRAFFIC DIRECTION | ACCESS FREQUENCY | PROPAGATION ENVIRONMENT | AREA RANGE |
|---|---|---|---|---|---|
| · LARGE (101 OR MORE)<br>· MEDIUM (10 TO 100)<br>· SMALL (9 OR LESS) | · HIGH (VIDEO AND THE LIKE)<br>· MEDIUM (DATA AND THE LIKE)<br>· LOW (SENSOR AND THE LIKE) | · UPLINK IS FREQUENT<br>· DOWNLINK IS FREQUENT<br>· UPLINK AND DOWNLINK ARE EQUIVALENT | · HIGH (VIDEO AND THE LIKE)<br>· MEDIUM<br>· LOW (SENSOR AND THE LIKE) | · INDOOR [CONCRETE]<br>· INDOOR [WOODEN CONSTRUCTION]<br>· OUTDOOR [URBAN AREA, CITY]<br>· OUTDOOR [SUBURB] | · WIDE (300 m OR MORE)<br>· MEDIUM (100 m OR MORE AND LESS THAN 300 m)<br>· NARROW (LESS THAN 100 m) |

Fig. 7

| # | USE CASE | THE NUMBER OF TERMINALS | TRAFFIC LOAD | TRAFFIC DIRECTION | ACCESS FREQUENCY | PROPAGATION ENVIRONMENT | AREA RANGE |
|---|---|---|---|---|---|---|---|
| 1 | DEFAULT | MEDIUM | MEDIUM | UPLINK AND DOWNLINK ARE EQUIVALENT | MEDIUM | OUTDOOR [URBAN AREA, CITY] | MEDIUM |
| 2 | CAMERA MOVING IMAGE TRANSMISSION | MEDIUM | HIGH | UPLINK IS FREQUENT | HIGH | OUTDOOR [URBAN AREA, CITY] | MEDIUM |
| 3 | MONITORING | MEDIUM | MEDIUM | UPLINK IS FREQUENT | MEDIUM | OUTDOOR [URBAN AREA, CITY] | MEDIUM |
| 4 | SENSOR | LARGE | LOW | UPLINK IS FREQUENT | LOW | OUTDOOR [SUBURB] | WIDE |
| 5 | DATA DISTRIBUTION | MEDIUM | MEDIUM | DOWNLINK IS FREQUENT | MEDIUM | INDOOR [WOODEN CONSTRUCTION] | MEDIUM |
| 6 | DATA TRANSFER | MEDIUM | MEDIUM | UPLINK AND DOWNLINK ARE EQUIVALENT | MEDIUM | INDOOR [CONCRETE] | MEDIUM |
| ... | ... | ... | ... | ... | ... | ... | ... |

Fig. 8

| ●THE NUMBER OF TERMINALS | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
|---|---|---|---|---|
| LARGE (101 OR MORE) | 0.3 | 1.0 | 1.0 | 1.0 |
| MEDIUM (10 TO 100) | 0.5 | 0.5 | 0.5 | 1.0 |
| SMALL (9 OR LESS) | 1.0 | 0.1 | 0.5 | 0.5 |

Fig. 9

| ●TRAFFIC LOAD | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
|---|---|---|---|---|
| HIGH (VIDEO AND THE LIKE) | 1.0 | 1.0 | 0.5 | 0.3 |
| MEDIUM (DATA AND THE LIKE) | 1.0 | 0.7 | 0.3 | 0.5 |
| LOW (SENSOR AND THE LIKE) | 0.3 | 0.3 | 1.0 | 1.0 |

Fig. 10

| ●TRAFFIC DIRECTION | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
|---|---|---|---|---|
| UPLINK IS FREQUENT | 0.7 | 1.0 | 1.0 | 1.0 |
| DOWNLINK IS FREQUENT | 1.0 | 0.7 | 0.5 | 0.7 |
| UPLINK AND DOWNLINK ARE EQUIVALENT | 0.7 | 1.0 | 0.7 | 0.7 |

Fig. 11

| ●ACCESS FREQUENCY | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
|---|---|---|---|---|
| HIGH (VIDEO AND THE LIKE) | 1.0 | 1.0 | 0.3 | 0.5 |
| MEDIUM | 0.7 | 1.0 | 0.5 | 0.7 |
| LOW (SENSOR AND THE LIKE) | 0.3 | 0.3 | 1.0 | 1.0 |

Fig. 12

| PROPAGATION ENVIRONMENT | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
|---|---|---|---|---|
| INDOOR [CONCRETE] | 1.0 | 1.0 | 0.7 | 0.7 |
| INDOOR [WOODEN CONSTRUCTION] | 1.0 | 1.0 | 0.7 | 0.7 |
| OUTDOOR [URBAN AREA, CITY] | 0.7 | 1.0 | 1.0 | 1.0 |
| OUTDOOR [SUBURB] | 0.5 | 1.0 | 1.0 | 1.0 |

Fig. 13

| ●AREA RANGE | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
|---|---|---|---|---|
| WIDE (300 m OR MORE) | 0.3 | 1.0 | 1.0 | 1.0 |
| MEDIUM (100 m OR MORE AND LESS THAN 300 m) | 0.5 | 0.5 | 0.7 | 0.7 |
| NARROW (LESS THAN 100 m) | 1.0 | 0.3 | 0.5 | 0.5 |

Fig. 14

| DEFAULT | | | | |
|---|---|---|---|---|
|  | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
| THE NUMBER OF TERMINALS | 0.5 | 0.5 | 0.5 | 1.0 |
| TRAFFIC LOAD | 1.0 | 0.7 | 0.3 | 0.5 |
| TRAFFIC DIRECTION | 0.7 | 1.0 | 0.7 | 0.7 |
| ACCESS FREQUENCY | 0.7 | 1.0 | 0.5 | 0.7 |
| PROPAGATION ENVIRONMENT | 0.7 | 1.0 | 1.0 | 1.0 |
| AREA RANGE | 0.5 | 0.5 | 0.7 | 0.7 |
| TOTAL | 4.1 | 4.7 | 3.7 | 4.6 |

Fig. 15

| CAMERA MOVING IMAGE TRANSMISSION | | | | |
|---|---|---|---|---|
| | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
| THE NUMBER OF TERMINALS | 0.5 | 0.5 | 0.5 | 1.0 |
| TRAFFIC LOAD | 1.0 | 1.0 | 0.5 | 0.3 |
| TRAFFIC DIRECTION | 0.7 | 1.0 | 1.0 | 1.0 |
| ACCESS FREQUENCY | 1.0 | 1.0 | 0.3 | 0.5 |
| PROPAGATION ENVIRONMENT | 0.7 | 1.0 | 1.0 | 1.0 |
| AREA RANGE | 0.5 | 0.5 | 0.7 | 0.7 |
| TOTAL | 4.4 | 5.0 | 4.0 | 4.5 |

Fig. 16

| MONITORING | | | | |
|---|---|---|---|---|
| | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
| THE NUMBER OF TERMINALS | 0.5 | 0.5 | 0.5 | 1.0 |
| TRAFFIC LOAD | 1.0 | 0.7 | 0.3 | 0.5 |
| TRAFFIC DIRECTION | 0.7 | 1.0 | 1.0 | 1.0 |
| ACCESS FREQUENCY | 0.7 | 1.0 | 0.5 | 0.7 |
| PROPAGATION ENVIRONMENT | 0.7 | 1.0 | 1.0 | 1.0 |
| AREA RANGE | 0.5 | 0.5 | 0.7 | 0.7 |
| TOTAL | 4.1 | 4.7 | 4.0 | 4.9 |

Fig. 17

| SENSOR | | | | |
|---|---|---|---|---|
| | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
| THE NUMBER OF TERMINALS | 0.3 | 1.0 | 1.0 | 1.0 |
| TRAFFIC LOAD | 0.3 | 0.3 | 1.0 | 1.0 |
| TRAFFIC DIRECTION | 0.7 | 1.0 | 1.0 | 1.0 |
| ACCESS FREQUENCY | 0.3 | 0.3 | 1.0 | 1.0 |
| PROPAGATION ENVIRONMENT | 0.5 | 1.0 | 1.0 | 1.0 |
| AREA RANGE | 0.3 | 1.0 | 1.0 | 1.0 |
| TOTAL | 2.4 | 4.6 | 6.0 | 6.0 |

Fig. 18

| DATA DISTRIBUTION | | | | |
|---|---|---|---|---|
| | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
| THE NUMBER OF TERMINALS | 0.5 | 0.5 | 0.5 | 1.0 |
| TRAFFIC LOAD | 1.0 | 0.7 | 0.3 | 0.5 |
| TRAFFIC DIRECTION | 1.0 | 0.7 | 0.5 | 0.7 |
| ACCESS FREQUENCY | 0.7 | 1.0 | 0.5 | 0.7 |
| PROPAGATION ENVIRONMENT | 1.0 | 1.0 | 0.7 | 0.7 |
| AREA RANGE | 0.5 | 0.5 | 0.7 | 0.7 |
| TOTAL | 4.7 | 4.4 | 3.2 | 4.3 |

Fig. 19

| DATA TRANSFER | | | | |
|---|---|---|---|---|
| | PRIORITIZE THROUGHPUT/ TERMINAL | PRIORITIZE HIGH ACCESS EFFICIENCY | PRIORITIZE LOW POWER CONSUMPTION | PRIORITIZE WIDE AREA |
| THE NUMBER OF TERMINALS | 0.5 | 0.5 | 0.5 | 1.0 |
| TRAFFIC LOAD | 1.0 | 0.7 | 0.3 | 0.5 |
| TRAFFIC DIRECTION | 0.7 | 1.0 | 0.7 | 0.7 |
| ACCESS FREQUENCY | 0.7 | 1.0 | 0.5 | 0.7 |
| PROPAGATION ENVIRONMENT | 1.0 | 1.0 | 0.7 | 0.7 |
| AREA RANGE | 0.5 | 0.5 | 0.7 | 0.7 |
| TOTAL | 4.4 | 4.7 | 3.4 | 4.3 |

WIRELESS COMMUNICATION SYSTEM, AND WIRELESS COMMUNICATION CONTROL APPARATUS, AND METHOD

CROSS-REFERENCE TO RELATED APPLICATIONS

This application is a National Stage application under 35 U.S.C. § 371 of International Application No. PCT/JP2020/012033, having an International Filing Date of Mar. 18, 2020, the disclosure of which is considered part of the disclosure of this application, and is incorporated by reference in its entirety into this application.

TECHNICAL FIELD

An embodiment of the present invention relates to a wireless communication system, a wireless communication control device, and a method.

BACKGROUND ART

A communication system (hereinafter may be referred to as a "system") to which a wireless LAN (Local Area Network) is applied is a wireless communication system that can be used at a low cost in a frequency band for which license is unnecessary, and accordingly, such systems have rapidly become popular, and a situation where a large number of wireless LAN terminals are present in the same area and interfere with each other is thought to be an issue (see NPL 1, for example).

Therefore, a large number of technologies are proposed to minimize influence of interference between wireless LAN terminals and increase the communication capacity of individual terminals or the entire system.

In a wireless communication system, for example, wireless LAN access points (base stations, APs: Access Points) interfering with each other acquire interference information of a surrounding region, and transmit the acquired information as wireless environment information to a control server, which serves as a wireless communication control device.

The control server performs calculation in order to allocate frequency channels to the APs such that the throughput of the group of APs is maximized, and sends back the result of calculation as control information to each AP.

On the other hand, types of wireless LAN terminals (STAs (stations)) that are connected to the APs, uses of the wireless LAN terminals, and types of introduced devices are increasing in the wireless communication system. Accordingly, the control server needs to calculate optimized parameters, taking information of the terminals connected to the APs into consideration.

Also, communication speed, delay time, the number of terminals that can be connected, the range of a communication area, and requirements of communication vary in a wide range according to an application program (hereinafter referred to as an "application") used in the system.

In addition, a requirement that is to be prioritized varies according to usage scenes such as an application and a device that use the wireless LAN.

For example, the 920 MHz band can be used in Japan by two types of stations, i.e., a specified low power radio station of which the maximum transmission power is 20 mW and a land mobile station of which the maximum transmission power is 250 mW.

Therefore, in a predetermined frequency bandwidth, the maximum transmission power, i.e., the radius of an area that can be covered varies according to a corresponding license.

It is necessary to consider such a difference in communication capability in implementation, when a parameter is optimized.

Also, content of frequency rules that are applied varies depending on whether the system is used in Japan or abroad, and the range of frequency channels that are supported differs between devices. These factors need to be considered as well when a parameter is optimized.

For example, bandwidths of frequency channels that are specified in the communication standard IEEE802.11ah are the following five bandwidths: 1 MHZ, 2 MHZ, 4 MHZ, 8 MHZ, and 16 MHz. Out of these bandwidths, only 1 MHz is the frequency bandwidth that is allowed in Japan, whereas a plurality of frequency bandwidths up to 16 MHz are allowed in some countries abroad. As described above, usage constraints on a wireless communication system vary according to the country in which wireless communication devices are used.

Furthermore, the frequency bandwidths described above include essential frequency bandwidths and optional frequency bandwidths, and accordingly, it is thought that frequency bandwidths used in the system vary according to the cost and uses of the devices.

Moreover, requirements relating to wireless communication vary according to a scenario in which the system is used and the type of an application used in the system.

For example, when a large number of sensor devices are used through wireless communication, maximization of the number of connected terminals and power saving of the sensor devices are requirements that are to be most prioritized.

When a moving image shot by a security camera is relayed through wireless communication, the communication speed of wireless communication is the requirement that is to be most prioritized.

When data communication is performed in a farm, a factory, or the like, the communication range of wireless communication is the requirement that is to be most prioritized.

As described above, the requirement that is to be most prioritized varies according to a scenario in which the system is used and the type of an application that is used, and accordingly, optimizing the throughput and the communication capacity uniformly may be insufficient for a user.

CITATION LIST

Non Patent Literature

[NPL 1] IEEE Std 802.11ahTM-2016 (IEEE Standard for Information technology-Telecommunications and information exchange between systems Local and metropolitan area networks-Specific equirements, Part 11: Wireless LAN Medium Access Control (MAC) and Physical Layer (PHY) Specifications, Amendment 2: Sub 1 GHz License Exempt Operation, IEEE Computer Society)

SUMMARY OF THE INVENTION

Technical Problem

As described above, in order to optimize wireless communication resources that are applied to various communication devices, or various services and applications in which wireless communication is used, it is insufficient to perform optimization uniformly as described above.

Accordingly, it is necessary to realize optimization that reflects usage constraints and requirements corresponding to each device and each usage scene.

The present invention was made focusing on the above circumstances, and has an object of providing a wireless communication system, a wireless communication control device, and a method with which setting information relating to wireless communication can be optimized.

Means for Solving the Problem

A wireless communication system according to an aspect of the present invention is a wireless communication system including: a wireless base station configured to perform wireless communication with a wireless terminal that belongs to the wireless base station; and a wireless communication control station that is communicably connected to the wireless base station and is configured to notify the wireless base station of information that indicates a parameter to be used for communication control by the wireless base station and the wireless terminal, based on wireless environment information regarding the wireless base station, wherein the wireless communication control station includes: a determination unit that determines a requirement that is prioritized among multiple types of requirements in wireless communication, according to a current use case of wireless communication; a setting unit that sets the information indicating the parameter to be used for communication control by the wireless base station and the wireless terminal, based on the requirement determined by the determination unit and the wireless environment information regarding the wireless base station; and a transmission unit that transmits the information set by the setting unit to the wireless base station.

A wireless communication control device according to an aspect of the present invention is a wireless communication control device that is communicably connected to a wireless base station that performs wireless communication with a wireless terminal that belongs to the wireless base station, the wireless communication control device including: a determination unit configured to determine a requirement that is prioritized among multiple types of requirements in wireless communication, according to a current use case of wireless communication; a setting unit configured to set information that indicates a parameter to be used for communication control by the wireless base station and the wireless terminal, based on the requirement determined by the determination unit and wireless environment information regarding the wireless base station; and a transmission unit configured to transmit the information set by the setting unit to the wireless base station.

A wireless communication method according to an aspect of the present invention is a method performed by a wireless communication control device that is communicably connected to a wireless base station that performs wireless communication with a wireless terminal that belongs to the wireless base station, the method including: determining a requirement that is prioritized among multiple types of requirements in wireless communication, according to a current use case of wireless communication; setting information that indicates a parameter to be used for communication control by the wireless base station and the wireless terminal, based on the determined requirement and wireless environment information regarding the wireless base station; and transmitting the set information to the wireless base station.

Effects of the Invention

According to the present invention, it is possible to optimize setting information relating to wireless communication.

BRIEF DESCRIPTION OF DRAWINGS

FIG. 6 is a diagram showing an example of parameters of constitutional elements of use cases, in the form of a table.

FIG. 7 is a diagram showing an example of parameters of constitutional elements of use cases, in the form of a table.

FIG. 8 is a diagram showing an example of scores set for respective requirements, with respect to a parameter of a constitutional element of use cases, in the form of a table.

FIG. 9 is a diagram showing an example of scores set for respective requirements, with respect to a parameter of a constitutional element of use cases, in the form of a table.

FIG. 10 is a diagram showing an example of scores set for respective requirements, with respect to a parameter of a constitutional element of use cases, in the form of a table.

FIG. 11 is a diagram showing an example of scores set for respective requirements, with respect to a parameter of a constitutional element of use cases, in the form of a table.

FIG. 12 is a diagram showing an example of scores set for respective requirements, with respect to a parameter of a constitutional element of use cases, in the form of a table.

FIG. 13 is a diagram showing an example of scores set for respective requirements, with respect to a parameter of a constitutional element of use cases, in the form of a table.

FIG. 14 is a diagram showing an example of calculation of scores relating to determination of a requirement that is to be most prioritized, in the form of a table.

FIG. 15 is a diagram showing an example of calculation of scores relating to determination of a requirement that is to be most prioritized, in the form of a table.

FIG. 16 is a diagram showing an example of calculation of scores relating to determination of a requirement that is to be most prioritized, in the form of a table.

FIG. 17 is a diagram showing an example of calculation of scores relating to determination of a requirement that is to be most prioritized, in the form of a table.

FIG. 18 is a diagram showing an example of calculation of scores relating to determination of a requirement that is to be most prioritized, in the form of a table.

FIG. 19 is a diagram showing an example of calculation of scores relating to determination of a requirement that is to be most prioritized, in the form of a table.

DESCRIPTION OF EMBODIMENTS

The following describes an embodiment of the present invention with reference to the drawings.

First, a typical wireless communication system will be described to facilitate understanding of the embodiment.

Figure 1:
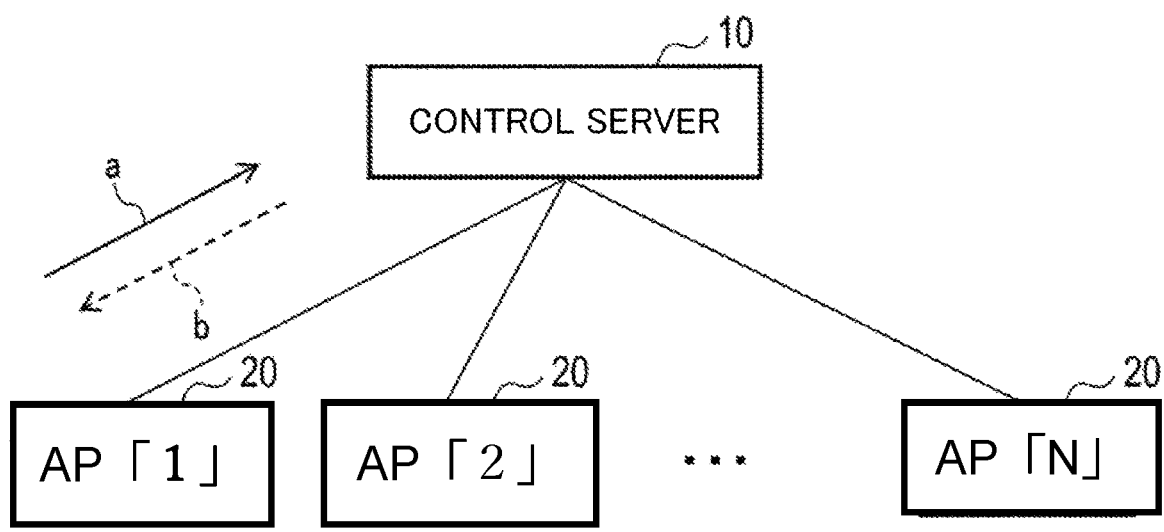
FIG. 1 is a diagram showing an application example of a typical wireless communication system.

FIG. 1 is a diagram showing an application example of the typical wireless communication system.

In the example shown in FIG. 1, the wireless communication system includes a control server 10 and a plurality of wireless LAN access points (APs) 20. The control server 10 may also be referred to as a "wireless communication control station" or a "wireless communication control device". The APs 20 may also be referred to as "wireless base stations".

Figure 2:
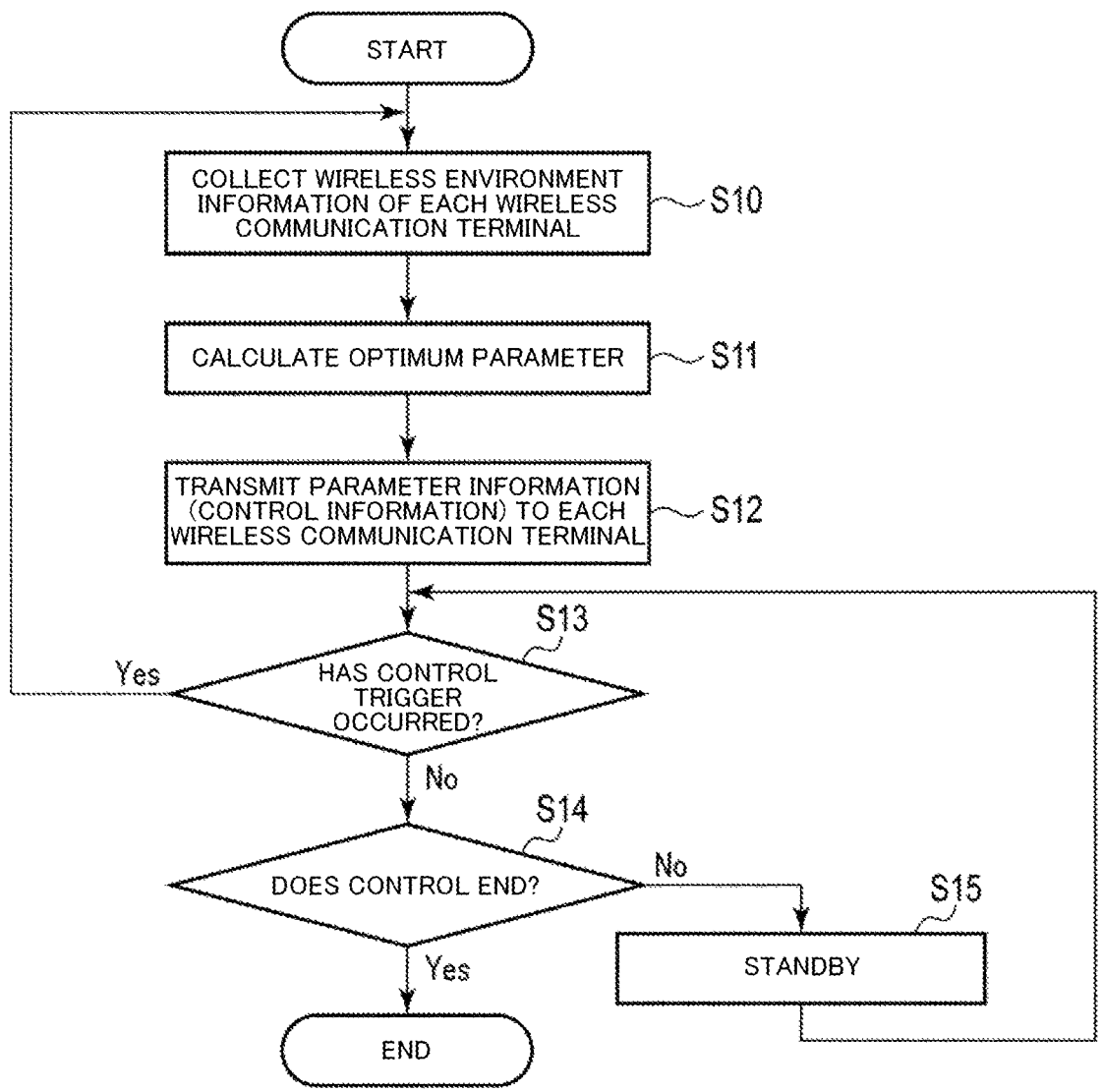
FIG. 2 is a flowchart showing an example of control performed in the typical wireless communication system.

In FIG. 2, N APs 20 are denoted as AP "1", AP "2", ... , and AP "N". In this system, the control server 10 is communicably connected to each AP 20 in an environment in which the plurality of APs 20 interfere with each other.

Each AP 20 can perform data communication with wireless LAN terminals (STAs) (not shown) that belong to the AP 20, using wireless frames. The wireless LAN terminals may also be referred to as "communication terminals". The APs 20 and STAs may also be referred to as "wireless communication terminals" in a broad sense.

In this system configuration, each AP 20 connected to the control server 10 can transmit wireless environment information to the control server 10. "a" shown in FIG. 1 corresponds to the wireless environment information.

Examples of the wireless environment information include: (1) usage information of a frequency channel such as APs for which SSIDs (Service Set Identifiers) acquired through carrier sense in a surrounding region can be identified, and a usage rate of the channel; and (2) parameters currently set for wireless devices in each AP, such as a frequency channel to be used, a channel bandwidth, a transmission power value, and a transmission time interval.

The control server 10 collects wireless environment information from each AP 20. The control server 10 calculates optimized parameters for the APs 20 using the wireless environment information under conditions where it is assumed that all of the APs 20 have the same specification and similar communication capacities are necessary.

Examples of the calculated parameters include the position of a frequency channel, a channel bandwidth, a transmission power value, and a transmission time interval.

Calculation results are transmitted as control information to the APs 20. "b" shown in FIG. 1 corresponds to the control information.

Upon receiving the control information, each AP 20 changes relevant setting values in the AP 20 in accordance with the control information.

When control is executed periodically or upon occurrence of some control trigger, optimized parameters are calculated again based on updated wireless environment information, and control information is transmitted to each AP 20.

FIG. 2 is a flowchart showing an example of control performed in the typical wireless communication system.

First, the control server 10 collects wireless environment information from each AP 20 (step S10), and calculates optimized parameters based on the collected information (step S11).

Here, the control server 10 transmits information that indicates the parameters calculated in step S11 as control information to the APs 20 (step S12).

Thereafter, when a predetermined period of time has elapsed, control is executed based on the parameters. Here, if occurrence of a control trigger has not been detected (No in step S13) and the control does not end (No in step S14), the control server 10 enters a standby state (step S15), and if occurrence of a control trigger has been detected (Yes in step S13), the control server 10 returns to step S10 and collection of wireless environment information and the following processing are executed again.

In an embodiment of the present invention, when different requirements are required for different wireless communication terminals in an environment in which the wireless communication terminals are present and interfere with each other, optimization of control information is executed for one or more wireless communication terminals, with consideration given to the respective requirements.

In an embodiment of the present invention, optimum control information, e.g., an optimum parameter and optimum usage conditions are calculated in an environment in which wireless communication terminals that have constraint conditions of different devices or usage environments, and different requirements are present in the same environment, interfering with each other. The usage conditions are, for example, specifications of devices relating to wireless communication, such as the maximum transmission power of a wireless communication terminal and the gain of an antenna.

In an embodiment of the present invention, usage conditions, usage constraints, and requirements corresponding to usage scenes are considered with respect to each of a plurality of wireless communication terminals that are to be controlled, and an optimum value of a frequency resource for each wireless communication terminal and an optimum value of a parameter set for the wireless communication terminal are calculated based on collected wireless environment information and individual requirements, rather than a single condition. Examples of the usage constraints include a constraint regarding the maximum transmission power that is specified in frequency rules for a frequency band in which the wireless communication terminal is used.

In a wireless communication system according to an embodiment of the present invention, an initial setting value and a range of control values at the time of optimization control are set for each of the wireless communication terminals, based on usage conditions and usage constraints peculiar to the respective wireless communication terminals, and requirements corresponding to usage scenes.

In the wireless communication system according to an embodiment of the present invention, a requirement that is to be most prioritized in a use case of a communication standard is determined as a result of comprehensive addition of scores that are set for respective requirements, with respect to parameters of constitutional elements of the use case. In this system, an optimum value of a parameter is calculated using a method for calculating the optimum value corresponding to the determined requirement.

In an embodiment of the present invention, when an optimum value is calculated, a method for calculating the optimum value is selected based on a requirement corresponding to an envisaged use case, with consideration given to usage conditions and usage constraints peculiar to each wireless communication terminal, under the circumstances where various wireless communication terminals and various usage scenes are envisaged. Therefore, optimization control that corresponds to individual requirements can be executed, as compared to optimization control in which only a particular wireless communication terminal and a particular requirement are envisaged.

In the wireless communication system according to an embodiment of the present invention, a requirement that needs to be considered in an envisaged use case is determined based on a numerical value that represents the requirement, and thus, it is possible to eliminate ambiguity of the degree of priority of the requirement, and uniquely determine the requirement to be considered in setting.

Figure 3:
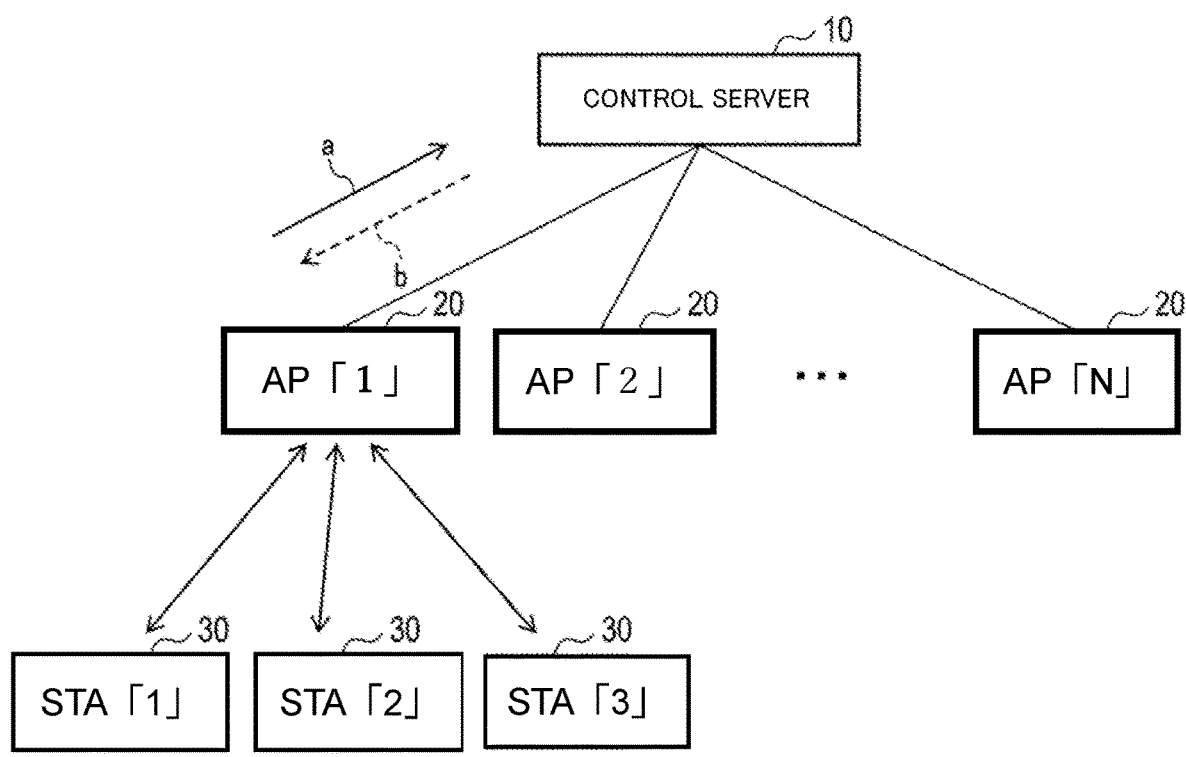
FIG. 3 is a diagram showing an application example of a wireless communication system according to an embodiment of the present invention.

FIG. 3 is a diagram showing an application example of the wireless communication system according to an embodiment of the present invention.

In the example shown in FIG. 3, the wireless communication system includes a control server 10 and a plurality of wireless LAN access points (APs) 20. In FIG. 3, N APs 20 are denoted as AP "1", AP "2", . . . , and AP "N". In this system, the control server 10 is communicably connected to each AP 20 in an environment in which the plurality of APs 20 interfere with each other.

Each AP 20 can perform data communication with wireless LAN terminals (STAs) 30 that belong to the AP 20, using wireless frames. In FIG. 3, three STAs 30 that belong to the AP "1" are denoted as STA "1", STA "2", and STA "3". Also, the other APs can perform data communication with STAs (not shown) that belong to the APs, using wireless frames.

In this system configuration, each AP 20 connected to the control server 10 can transmit wireless environment information to the control server 10.

Examples of the wireless environment information include: (1) usage information of a frequency channel such as APs for which SSIDs can be identified through carrier sense in a surrounding region, and a usage rate of the channel; (2) parameters currently set for wireless devices in each AP, such as a frequency channel to be used, a channel bandwidth, and a transmission power value; (3) usable ranges of parameters such as a frequency range and a range of transmission power values that are set for a region such as a country or set as specifications of a device, for example; (4) current connection information such as the number and types of wireless LAN terminals that are connected to the AP, information of channels that can be used by the wireless LAN terminals, and transmission power information; and (5) traffic information and information of an application program that are set or observed in an upper unit in the wireless communication system.

The control server 10 collects information acquired from the APs 20 and sets ranges of parameter values that can be set in the APs, as ranges of controllable values.

The control server 10 determines requirements relating to the wireless communication system according to observed traffic information, application information, or use cases that are envisaged for the respective APs 20 and set in the control server 10. Furthermore, the control server 10 sets initial values of optimum parameters relating to the use cases based on current usage conditions of frequency channels in a surrounding region.

The set initial values are transmitted as control information from the control server 10 to the APs 20.

Upon receiving the control information, each AP 20 changes setting values relating to STAs 30 that belong to the AP 20, in accordance with the control information.

When control is executed by the control server 10 periodically or upon occurrence of some trigger, optimum values of the parameters are set again based on updated information such as current connection information and usage information of frequency channels in a surrounding region, and the set values are transmitted as control information to the APs 20.

Figure 4:
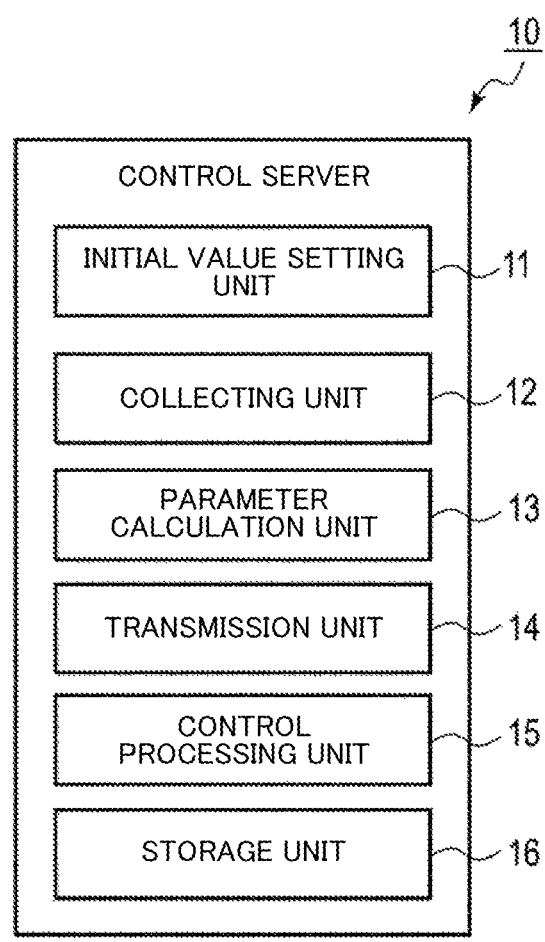
FIG. 4 is a block diagram showing a functional configuration example of a control server.

FIG. 4 is a block diagram showing a functional configuration example of the control server.

As shown in FIG. 4, the control server 10 includes an initial value setting unit 11, a collecting unit 12, a parameter calculation unit 13, a transmission unit 14, a control processing unit 15, and a storage unit 16. The parameter calculation unit 13 corresponds to a determination unit and a setting unit. Operations of the respective units will be described later. The control processing unit 15 controls operations of the initial value setting unit 11, the collecting unit 12, the parameter calculation unit 13, and the transmission unit 14.

Figure 5:
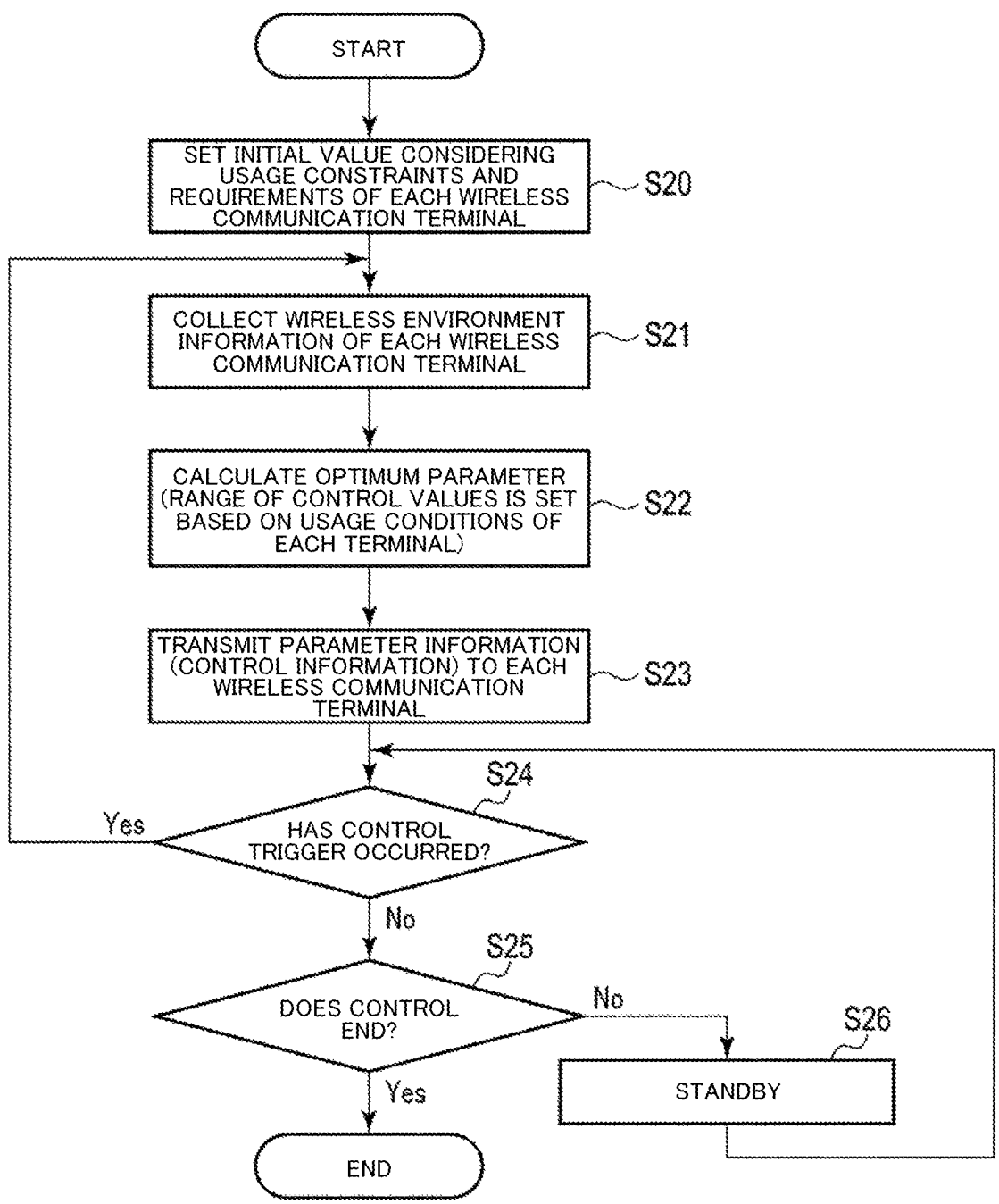
FIG. 5 is a flowchart showing an example of control performed in the wireless communication system according to an embodiment of the present invention.

FIG. 5 is a flowchart showing an example of control performed in the wireless communication system according to an embodiment of the present invention.

In the present embodiment, values of parameters of constitutional elements of use cases according to IEEE802.11ah are set by the initial value setting unit 11 of the control server 10 and are stored in the storage unit 16 (step S20).

In the present embodiment, ranges of setting values relating to the APs 20 are individually set based on ranges of values of parameters that can be used in the wireless communication system. Also, in the present embodiment, a requirement that is to be prioritized is determined according to observed traffic information, application information, or a use case that is envisaged for each of the APs 20 and set in the control server 10.

In the present embodiment, scores are set for respective requirements that are considered, with respect to values of parameters of constitutional elements of the use cases, for example.

In the present embodiment, the sum or an integrated value of scores relating to the respective constitutional elements is taken to be an overall score of a requirement, and a requirement that has the highest score among the requirements is taken to be the requirement that is to be most prioritized in the use case of the AP.

Next, an example of parameters of constitutional elements of the use cases according to IEEE802.11ah will be described. FIG. 6 is a diagram showing an example of the parameters of the constitutional elements of the use cases, in the form of a table.

As shown in FIG. 6, in IEEE802.11ah, requirements of resource setting vary depending on use cases to be used.

In the example shown in FIG. 6, the constitutional elements of the use cases are "the number of terminals (standard number)", "traffic load", "traffic direction", "access frequency", "propagation environment", and "area range".

Types of the parameter of the constitutional element "the number of terminals" are "large (101 or more)", "medium (10 to 100)", and "small (9 or less)".

Types of the parameter of the constitutional element "traffic load" are "high (video and the like)", "medium (data and the like)", and "low (sensor and the like)".

Types of the parameter of the constitutional element "traffic direction" are "uplink direction is frequent" (which may be described as "uplink is frequent"), "downlink direction is frequent" (which may be described as "downlink is frequent"), and "uplink direction and downlink direction are equivalent" (which may be described as "uplink and downlink are equivalent").

Types of the parameter of the constitutional element "access frequency" are "high (video and the like)", "medium", and "low (sensor and the like)".

Types of the parameter of the constitutional element "propagation environment" are "indoor [concrete]", "indoor [wooden construction]", "outdoor [urban area, city]", and "outdoor [suburb]".

Types of the parameter of the constitutional element "area range" is "wide (300 [m] or more)", "medium (100 [m] or more and less than 300 [m])", and "narrow (less than 100 [m])".

FIG. 7 is a diagram showing an example of parameters of constitutional elements of use cases, in the form of a table.

FIG. 7 shows an example of constitutional elements of use cases envisaged in IEEE802.11ah, and values of parameters of the constitutional elements in the respective use cases.

In the example shown in FIG. 7, the use cases are categorized as default, camera moving image transmission, monitoring, sensor, data distribution, data transfer, and so on. Values of parameters of the constitutional elements are shown with respect to each of the use cases, and are stored in the storage unit 16 of the control server 10. For example, in the use case "camera moving image transmission", the value of the parameter relating to the constitutional element "traffic load" is "high". "Default" is a standard use case.

The values of parameters shown in FIG. 7 may be changed through an input operation performed by an administrator of the system. It should be noted that the values of parameters of the constitutional elements in the use case "default" may be changed and a new use case relating to the changed values may be added.

FIGS. 8 to 13 are diagrams showing examples of scores set for respective requirements, with respect to parameters of constitutional elements of use cases, in the form of tables.

As shown in FIGS. 8 to 13, scores are set for respective requirements, with respect to values of parameters of constitutional elements of use cases, and are stored in the storage unit 16 of the control server 10. In the examples shown in FIGS. 8 to 13, the requirements are "prioritize throughput per terminal (prioritize throughput/terminal)", "prioritize high access efficiency", "prioritize low power consumption", and "prioritize wide area".

In the example shown in FIG. 8, scores are set for the requirements "prioritize throughput per terminal", "prioritize high access efficiency", "prioritize low power consumption", and "prioritize wide area", with respect to each of the values "large (101 or more)", "medium (10 to 100)", and "small (9 or less)" of the parameter of the constitutional element "the number of terminals" of use cases. These scores indicate whether the degree of priority of a requirement to be set is high or low, with respect to the values of the parameter of the constitutional element of use cases.

In FIG. 8, the score of the requirement "prioritize throughput per terminal" set with respect to the value "large" of the parameter of the constitutional element "the number of terminals" is "0.3". The score of the requirement "prioritize throughput per terminal" set with respect to the value "medium" of the parameter of the constitutional element "the number of terminals" is "0.5". The score of the requirement "prioritize throughput per terminal" set with respect to the value "small" of the parameter of the constitutional element "the number of terminals" is "1.0".

In the example shown in FIG. 8, the value "large" of the parameter of the constitutional element "the number of terminals" indicates that the degree of priority of the requirement "prioritize throughput per terminal" is relatively low, and the value "small" of the parameter of the constitutional element "the number of terminals" indicates that the degree of priority of the requirement "prioritize throughput per terminal" is relatively high.

In the example shown in FIG. 9, scores are set for the respective requirements, with respect to each of the values "high (video and the like)", "medium (data and the like)", and "low (sensor and the like)" of the parameter of the constitutional element "traffic load" of use cases.

In the example shown in FIG. 10, scores are set for the respective requirements, with respect to each of the values "uplink direction is frequent", "downlink direction is frequent", and "uplink direction and downlink direction are equivalent" of the parameter of the constitutional element "traffic direction" of use cases.

In the example shown in FIG. 11, scores are set for the respective requirements, with respect to each of the values "high (video and the like)", "medium", and "low (sensor and the like)" of the parameter of the constitutional element "access frequency" of use cases.

In the example shown in FIG. 12, scores are set for the respective requirements, with respect to each of the values "indoor [concrete]", "indoor [wooden construction]", "outdoor [urban area, city]", and "outdoor [suburb]" of the parameter of the constitutional element "propagation environment" of use cases.

In the example shown in FIG. 13, scores are set for the respective requirements, with respect to each of the values "wide (300 [m] or more)", "medium (100 [m] or more and less than 300 [m])", and "narrow (less than 100 [m])" of the parameter of the constitutional element "area range" of use cases.

In the present embodiment, the initial value setting unit 11 of the control server 10 calculates, for example, the sum of scores set for a requirement with respect to constitutional elements of a target use case, and performs this calculation with respect to each requirement.

The initial value setting unit 11 determines at least one requirement that has the highest score among the requirements as a result of the calculation to be the requirement that is to be most prioritized.

As an example of the calculation described above, the initial value setting unit 11 selects one from options of each item $M_i$ of the constitutional elements "the number of terminals", "traffic load", "traffic direction", "access frequency", "propagation environment", and "area range", with respect to each use case.

The selected item is represented by k, and a requirement for which calculation is to be performed is represented by l. At this time, a numerical value relating to the requirement l with respect to the option k of the item $M_i$ is represented by $M_i(k, l)$.

An evaluation formula Pi of the prioritized item 1 to be calculated is the following formula (1), for example.

[Math. 1]

$$\Pi M_i(k,l) \qquad \text{formula (1)}$$

Other than the above, the following formula (2) may be used as the evaluation formula.

$$P_l = \Sigma M_i(k,l) \qquad \text{formula (2)}$$

The following describes a specific example of calculation of the sum of scores and determination of a requirement that is to be most prioritized.

FIGS. 14 to 19 are diagrams showing examples of calculation of scores relating to determination of a requirement to be most prioritized, in the form of tables. The scores shown in FIGS. 14 to 19 correspond to the scores shown in FIGS. 8 to 13. In FIGS. 15 to 19, scores that differ from those shown in FIG. 14 and constitutional elements relating to the scores are shown in boldface.

The example shown in FIG. 14 shows scores that are set for the respective requirements with respect to the constitutional elements "the number of terminals", "traffic load", "traffic direction", "access frequency", "propagation environment", and "area range" of the use case "default", according to the values of parameters of the constitutional elements of the use case "default" shown in FIG. 7. The sum of scores set for the requirement "prioritize throughput per terminal" with respect to the constitutional elements described above is "4.1". The sum of scores set for the requirement "prioritize high access efficiency" with respect to the constitutional elements is "4.7", and the sum of scores set for the requirement "prioritize low power consumption" with respect to the constitutional elements is "3.7". The sum of scores set for the requirement "prioritize wide area" with respect to the constitutional elements is "4.6".

In the example shown in FIG. 14, the sum "4.7" of scores set for the requirement "prioritize high access efficiency" with respect to the constitutional elements of the use case "default" is the highest among the sums of scores set for the respective requirements. Therefore, the requirement "prioritize high access efficiency" is the requirement that is to be most prioritized in the use case "default".

In the example shown in FIG. 15, the sum "5.0" of scores set for the requirement "prioritize high access efficiency" with respect to the constitutional elements of the use case "camera moving image transmission" is the highest among the sums of scores set for the respective requirements. Therefore, the requirement "prioritize high access efficiency" is the requirement that is to be most prioritized in the use case "camera moving image transmission".

In the example shown in FIG. 16, the sum "4.9" of scores set for the requirement "prioritize wide area" with respect to the constitutional elements of the use case "monitoring" is the highest among the sums of scores set for the respective requirements. Therefore, the requirement "prioritize wide area" is the requirement that is to be most prioritized in the use case "monitoring".

In the example shown in FIG. 17, the sum "6.0" of scores set for the requirement "prioritize low power consumption" and the sum "6.0" of scores set for the requirement "prioritize wide area" with respect to the constitutional elements of the use case "sensor" are the highest among the sums of scores set for the respective requirements. Therefore, the requirements "prioritize low power consumption" and "prioritize wide area" are the requirements that are to be most prioritized in the use case "sensor".

In the example shown in FIG. 18, the sum "4.7" of scores set for the requirement "prioritize throughput per terminal" with respect to the constitutional elements of the use case "data distribution" is the highest among the sums of scores set for the respective requirements. Therefore, the requirement "prioritize throughput per terminal" is the requirement that is to be most prioritized in the use case "data distribution".

In the example shown in FIG. 19, the sum "4.7" of scores set for the requirement "prioritize high access efficiency" with respect to the constitutional elements of the use case "data transfer" is the highest among the sums of scores set for the respective requirements. Therefore, the requirement "prioritize high access efficiency" is the requirement that is to be most prioritized in the use case "data transfer".

The description will be given referring again to FIG. 5. The collecting unit 12 of the control server 10 collects wireless environment information from each wireless communication terminal (step S21).

The parameter calculation unit 13 of the control server 10 calculates optimum values of parameters relating to wireless communication terminals based on the wireless environment information collected in step S21 (step S22).

When the optimum values of the parameters are calculated, usage conditions of each wireless communication terminal, such as the maximum transmission power and the gain of an antenna can be considered in terms of control ranges. Also, a requirement that has been determined as described above can be considered when the optimum values of the parameters are calculated.

For example, in a case where the determined requirement is "prioritize wide area", calculation of an optimum transmission power value is not executed, and control is performed such that the maximum transmission power value is used, for example.

As described above, calculation results of optimum values of parameters vary depending on the requirement to be prioritized, which is determined as described above.

Figure 20:
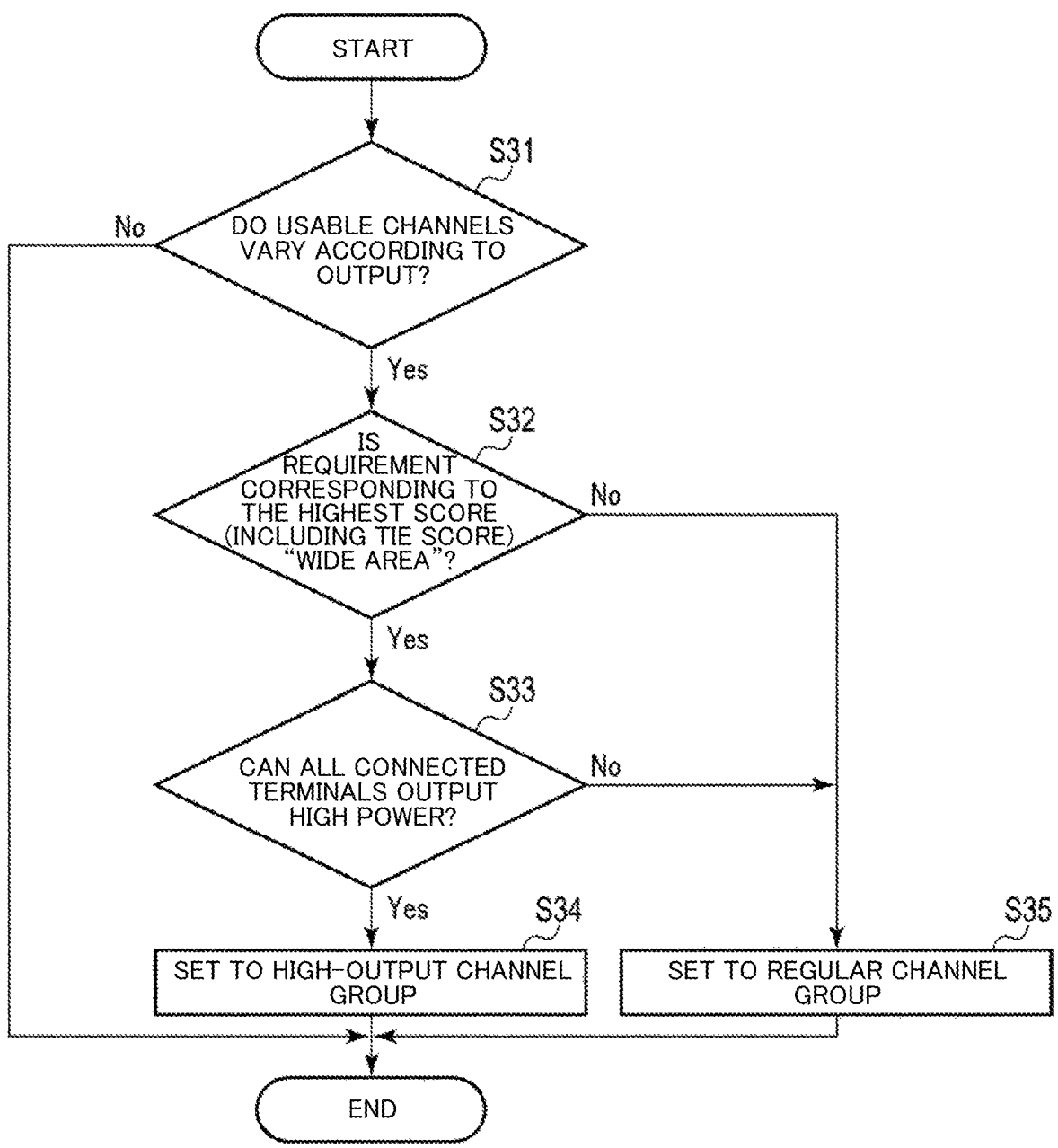
FIG. 20 is a flowchart showing a first example of control performed in the wireless communication system according to an embodiment of the present invention, with respect to setting of a parameter based on a requirement that is to be prioritized.

The following describes examples of control relating to setting of a parameter based on a requirement to be most prioritized, which is performed in step S22 described above. FIG. 20 is a flowchart showing a first example of control relating to setting of a parameter based on a requirement to be prioritized, which is performed in the wireless communication system according to an embodiment of the present invention.

In the first example, the parameter calculation unit 13 of the control server 10 initially sets a frequency band (channel group) to be used in order to set an upper limit of the transmission power value, when setting transmission power values for APs and STAs that belong to the control server 10 and are to be controlled.

For example, as frequency bands that can be used in Japan for RFID (Radio Frequency Identifier) (received signal strength indicator), there are a frequency band in which the upper limit of transmission power is 250 mW and a frequency band in which the upper limit of transmission power is 20 mW.

When channels that can be used vary according to output as described above according to information of a country in which the system is operated (Yes in Step S31), it is necessary to determine a channel group in which the APs and STAs to be controlled are to be operated, after transmission power values necessary for the APs and STAs are set. When No in step S31, processing in the first example of control ends.

When the requirement that is to be most prioritized, which has been determined as described above and corresponds to the highest score (including the case of a tie score), is "prioritize wide area" (written as "wide area" in FIG. 20) (Yes in step S32), the APs and STAs to be controlled need to transmit wireless signals as far as possible. In this case, if all of the APs and STAs to be controlled can output high power, which is 250 mW in this example (Yes in step S33), the parameter calculation unit 13 sets the APs and STAs to be controlled to a high-output channel group in which 250 mW is the maximum transmission power (step S34).

On the other hand, when the requirement to be most prioritized is not "prioritize wide area" (No in step S32), the parameter calculation unit 13 sets the APs and STAs to be controlled to a regular channel group in which 20 mW is the maximum transmission power so that consideration will be given to the influence of interference on the surrounding region (step S35). The same also applies to a case where No in step S32.

Figure 21:
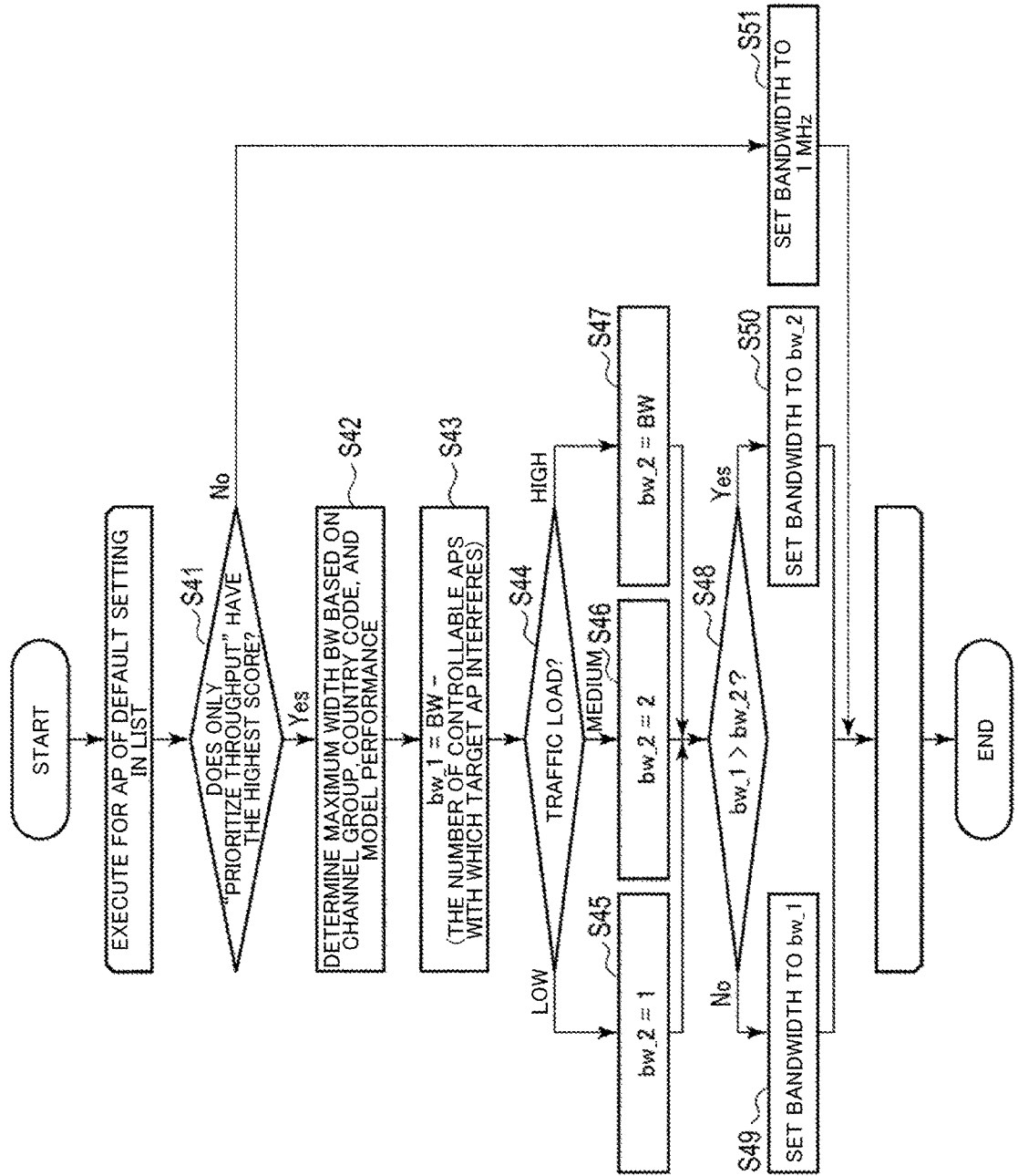
FIG. 21 is a flowchart showing a second example of control performed in the wireless communication system according to an embodiment of the present invention, with respect to setting of a parameter based on a requirement that is to be prioritized.

Next, the following describes an example of control relating to setting of the value of a parameter when only set items are referred to, other than the requirement to be most prioritized. FIG. 21 is a flowchart showing a second example of control relating to setting of a parameter based on a requirement to be prioritized, which is performed in the wireless communication system according to an embodiment of the present invention.

In the second example, the parameter calculation unit 13 of the control server 10 sets a channel bandwidth for an AP that is to be controlled.

Here, if the requirement "prioritize throughput" is not the single requirement to be most prioritized (No in step S41), as control that is performed on an AP of default setting, which is included in a list of control targets, the parameter calculation unit 13 allocates 1 MHz, which is the narrowest bandwidth, as the channel bandwidth for the AP to be controlled (step S51), in order to avoid interference with wireless communication systems in a surrounding region.

On the other hand, if the requirement "prioritize throughput" is the single requirement to be most prioritized (Yes in step S41), control for setting the value of a parameter from usable bandwidths according to values of items that are set when use conditions and requirements are calculated is performed as described below.

In the control, the parameter calculation unit 13 sets a maximum value BW of the channel bandwidth based on a channel group, a country code, and model performance, for example (step S42). The parameter calculation unit 13 determines bw_1 using the following formula (3) (step S43).

$$bw\_1 = BW - (\text{the number of controllable } APs \text{ with which } AP \text{ to be controlled interferes}) \quad \text{formula (3)}$$

Then, the parameter calculation unit 13 determines which of "low", "medium", and "high" the current traffic load corresponds to (step S44). When the current traffic load is "low", the parameter calculation unit 13 sets bw_2 to "1" (step S45). When the current traffic load is "medium", the parameter calculation unit 13 sets bw_2 to "2" (step S46). When the current traffic load is "high", the parameter calculation unit 13 sets bw_2 to the maximum value BW (step S47).

bw_1 and bw_2 are selected from a set {1, 2, 4, 8, 16}, rather than integers. When bw_1 is 0 or less, bw_1 is set to 1.

After step S45, S46, or S47, if bw_1 is no greater than bw_2 (No in step S48), the parameter calculation unit 13 sets the channel bandwidth to bw_1 (step S49). If bw_1 is greater than bw_2 (Yes in step S48), the parameter calculation unit 13 sets the channel bandwidth to bw_2 (step S49). As described above, an optimum value of a parameter is calculated in step S22 based on the requirement determined as described above and the range of values of the parameter.

The description will be given referring again to FIG. 5. The transmission unit 14 of the control server 10 transmits information of calculated values of parameters as control information to the wireless communication terminals (step S23).

Thereafter, in a case where control is performed based on the parameters after a predetermined period of time has elapsed, if occurrence of a control trigger has not been detected (No in step S24) and the control does not end (No in step S25), the control server 10 enters a standby state (step S26), and if a control trigger has occurred (Yes in step S24), the control server 10 returns to step S21 and collection of wireless environment information is executed again. When the control has ended (Yes in step S25), the series of processing steps shown in FIG. 5 ends.

Next, the following describes a third example of control relating to setting of a parameter based on a requirement to be prioritized.

In the third example, the parameter calculation unit 13 of the control server 10 sets transmission time intervals for the APs and STAs that belong to the control server 10 and are to be controlled. Here, when the requirement to be prioritized is "prioritize high access efficiency" or the value of the parameter of the constitutional element "the number of terminals" is "large (101 or more)", transmission time intervals of data frames at which the APs and STAs start transmission are controlled.

For example, in a wireless LAN that uses a frequency band for which license is unnecessary, a period of time for executing carrier sense (hereinafter referred to as a "carrier sense time") in order to avoid collision of wireless signals is used as a period of time that is at least a predetermined period of time and is calculated using random numbers. Consequently, intervals between times at which wireless signals are transmitted are spaced apart from each other.

If the parameter calculation unit 13 makes the intervals between times at which wireless signals are transmitted long through setting, for example, the probability of wireless signals colliding with each other can be reduced even when the number of terminals present in the same area is large.

Also, if the parameter calculation unit 13 sets a period of time until the next wireless signal is transmitted after a terminal has completed transmission of a wireless signal, i.e., a pause period, to be longer than the usual carrier sense time, rather than making the carrier sense time long through setting, another terminal that has not completed transmission yet can be prioritized to start transmission.

Further, RAW (Restricted Access Window) and TWT (Target Wake Time) specified in IEEE802.11ah have functions of restricting time at which transmission is performed by STAs. In the third example of control, whether or not to use these functions and a setting value relating to the functions, e.g., the way to separate groups or time at which transmission can be performed, can be determined through setting of the requirement or the number of terminals performed by the parameter calculation unit 13.

Control relating to transmission time intervals, which is performed to avoid collision of wireless signals when a large number of terminals are present in the same area as described above, reduces a usage rate of frequency resources per time when the number of terminals present in the same area is small, because overhead occurs in communication. Therefore, it is desirable that the control is adaptively performed according to the environment or the use case in which wireless communication is used, as in the embodiment of the present invention.

Figure 22:
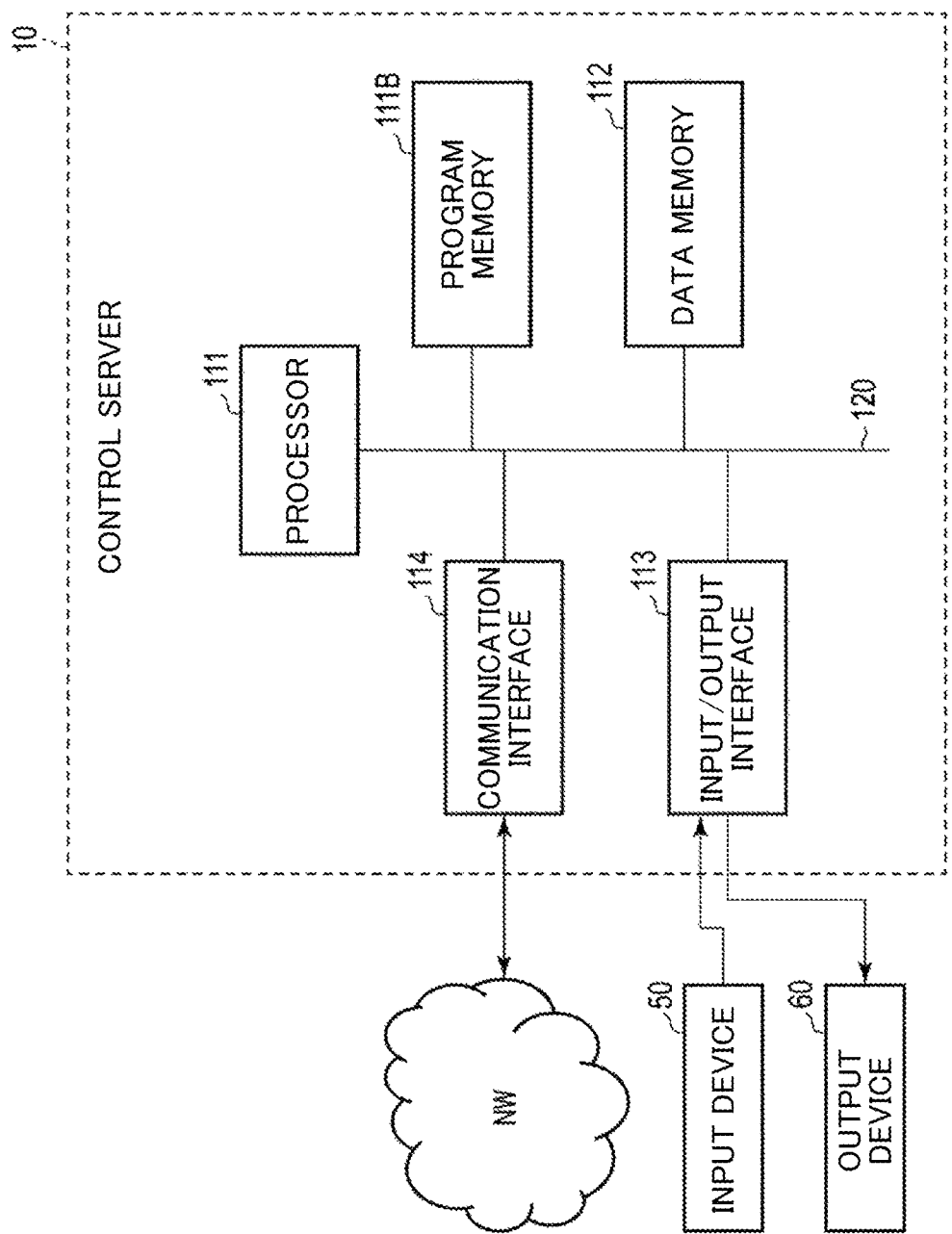
FIG. 22 is a block diagram showing an example of a hardware configuration of the control server in the wireless communication system according to an embodiment of the present invention.

FIG. 22 is a block diagram showing an example of a hardware configuration of the control server of the wireless communication system according to an embodiment of the present invention.

In the example shown in FIG. 22, the control server 10 according to the above embodiment is constituted by a server computer or a personal computer, for example, and includes a hardware processor 111A such as a CPU. A program memory 111B, a data memory 112, an input/output interface 113, and a communication interface 114 are connected to the hardware processor 111A via a bus 120. The same configuration can also be employed for the APs 20 and the STAs 30.

The communication interface 114 includes at least one wireless communication interface unit, for example, and enables transmission and reception of information to and from a communication network NW. As a wireless interface, for example, an interface for which a low-power wireless data communication standard of wireless LANs or the like is employed is used.

An input device 50 and an output device 60 for the administrator may be connected to the input/output interface 113.

A non-volatile memory that enables writing and reading at any time, such as an HDD (Hard Disk Drive) or an SSD (Solid State Drive), and a non-volatile memory such as a ROM (Read Only Memory), which are tangible non-temporary storage mediums, are used in combination as the program memory 111B, for example, and a program that is necessary to execute various types of control processing according to an embodiment is stored in the program memory 111B.

The non-volatile memory described above and a volatile memory such as a RAM (Random Access Memory), which are tangible storage mediums, are used in combination as the data memory 112, for example, to store various types of data that are acquired or created when various types of processing are performed.

The control server 10 according to an embodiment of the present invention can be configured as a data processing device that includes, as processing functional units that are realized by software, the initial value setting unit 11, the collecting unit 12, the parameter calculation unit 13, the transmission unit 14, and the control processing unit 15, which are shown in FIG. 4.

The storage unit 16 can be realized using the data memory 112 shown in FIG. 22. However, a storage region in the data memory 112 is not an essential constituent of the control server 10, and may be a region in an external storage medium such as a USB (Universal Serial Bus) memory or a region in a storage device such as a database server provided in a cloud, for example.

All of the processing functional units of the control server 10 described above can be realized by causing the hardware processor 111A to read and execute the program stored in the program memory 111B. It should be noted that some or all of the processing functional units may be realized in various other forms including integrated circuits such as an ASIC (Application Specific Integrated Circuit) and an FPGA (Field-Programmable Gate Array).

The method described in the embodiment can be stored, as a program (software means) that can be executed by a computer, on a recording medium such as a magnetic disk (Floppy (registered trademark) disk, hard disk, etc.), an optical disc (CD-ROM, DVD, MO, etc.), or a semiconductor memory (ROM, RAM, Flash memory, etc.), or can be transmitted and distributed via a communication medium. The program stored on the medium also includes a setting program for configuring software means (including not only an execution program, but also a table and a data structure) to be executed by a computer, in the computer. A computer that realizes the device builds the software means by reading the program recorded on the recording medium, and using the setting program depending on cases, and executes the processing described above as a result of operations of the computer being controlled by the software means. The recording medium referred to in the present specification is not limited to a recording medium used for distribution, and encompasses storage mediums such as a magnetic disk and a semiconductor memory that are provided in the computer or a device connected via a network.

The present invention is not limited to the embodiment described above, and various changes can be made without departing from the gist of the present invention, when the present invention is implemented. Embodiments may be combined as appropriate, and in such a case, combined effects can be achieved. The above embodiment includes various inventions, and the various inventions can be extracted by combining constitutional elements selected from the disclosed constitutional elements. For example, if the problem can be solved and the effects can be achieved even when some constitutional elements of all the constitutional elements described in the embodiment are omitted, a configuration in which these constitutional elements are eliminated can be extracted as an invention.

REFERENCE SIGNS LIST

10 Control server
20 Wireless LAN access point (AP)
30 Wireless LAN terminal (STA)

The invention claimed is:

1. A wireless communication system comprising:
a wireless base station configured to perform wireless communication with a wireless terminal that belongs to the wireless base station; and
a wireless communication control station that is communicably connected to the wireless base station and is configured to notify the wireless base station of information that indicates a parameter to be used for communication control by the wireless base station and the wireless terminal, based on wireless environment information regarding the wireless base station,
wherein the wireless communication control station includes:
a determination unit, implemented with one or more processors, configured to determine a prioritized requirement from among multiple requirements in the wireless communication, according to a use case of the wireless communication, wherein the multiple requirements include two or more of a throughput of the wireless terminal, an access efficiency, a power consumption, and a coverage area;
a setting unit, implemented with one or more processors, configured to set the information indicating the parameter to be used for communication control by the wireless base station and the wireless terminal, based on the prioritized requirement determined by the determination unit and the wireless environment information regarding the wireless base station;
a transmission unit, implemented with one or more processors, configured to transmit the information set by the setting unit to the wireless base station; and
a storage device configured to store setting information, the setting information including a score indicating a degree of priority for each of multiple elements constituting the use case of the wireless communication and each of the multiple requirements,
wherein the determination unit is configured to determine the prioritized requirement having a highest total score associated with the multiple elements, wherein a total score is obtained by summing a score of each element.

2. The wireless communication system according to claim 1, wherein the setting unit of the wireless communication control station is configured to set information that indicates a value of the parameter to be used for communication control by the wireless base station and the wireless terminal, and information that indicates a range of values of the parameter, based on the prioritized requirement determined by the determination unit and the wireless environment information regarding the wireless base station.

3. The wireless communication system according to claim 1, wherein the multiple elements comprise two or more of a number of wireless terminals, a traffic load, a traffic direction, an access frequency, propagation environment, and an area range.

4. A wireless communication control device that is communicably connected to a wireless base station that performs wireless communication with a wireless terminal that belongs to the wireless base station, the wireless communication control device comprising:
   a determination unit, implemented with one or more processors, configured to determine a prioritized requirement from among multiple requirements in the wireless communication, according to a use case of the wireless communication, wherein the multiple requirements include two or more of a throughput of the wireless terminal, an access efficiency, a power consumption, and a coverage area;
   a setting unit, implemented with one or more processors, configured to set information that indicates a parameter to be used for communication control by the wireless base station and the wireless terminal, based on the prioritized requirement determined by the determination unit and wireless environment information regarding the wireless base station;
   a transmission unit, implemented with one or more processors, configured to transmit the information set by the setting unit to the wireless base station; and
   a storage device configured to store setting information, the setting information including a score indicating a degree of priority for each of multiple elements constituting the use case and each of the multiple requirements,
   wherein the determination unit is configured to determine the prioritized requirement having a highest total score associated with the multiple elements, wherein a total score is obtained by summing a score of each element.

5. The wireless communication control device according to claim 4, wherein the setting unit is configured to set information that indicates an initial value of the parameter to be used for communication control by the wireless base station and the wireless terminal, and information that indicates a range of values of the parameter, based on the prioritized requirement determined by the determination unit and the wireless environment information regarding the wireless base station.

6. A method performed by a wireless communication control device that is communicably connected to a wireless base station that performs wireless communication with a wireless terminal that belongs to the wireless base station, the method comprising:
   determining a prioritized requirement from among multiple requirements in the wireless communication, according to a use case of the wireless communication, wherein the multiple requirements include two or more of a throughput of the wireless terminal, an access efficiency, a power consumption, and a coverage area;
   setting information that indicates a parameter to be used for communication control by the wireless base station and the wireless terminal, based on the prioritized requirement and wireless environment information regarding the wireless base station;
   transmitting the set information to the wireless base station; and
   storing setting information, the setting information including a score indicating a degree of priority for each of multiple elements constituting the use case and each of the multiple requirements;
   wherein the prioritized requirement has a highest total score associated with the multiple elements, and a total score is obtained by summing a score of each element.

* * * * *